United States Patent [19]

McInturff et al.

[11] 4,155,190
[45] May 22, 1979

[54] FISHING LURE RETRIEVER

[76] Inventors: Edward T. McInturff, 3658-6th Ave., Edgewater, Md. 21037; Ronald L. Orrison, 4056 Hunt Rd., Fairfax, Va. 22030; Austin L. Orrison, Jr., 14408 Lake Dr., Woodbridge, Va. 22191

[21] Appl. No.: 799,869
[22] Filed: May 23, 1977
[51] Int. Cl.² ............................................. A01K 97/00
[52] U.S. Cl. ...................................... 43/17.2; 24/239
[58] Field of Search ............... 43/5, 17.2; 114/221 R, 114/221 A; 166/54.5; 16/108, 109; 24/238, 239, 241 SL, 241 S

[56] References Cited

U.S. PATENT DOCUMENTS

| | | |
|---|---|---|
| 2,453,245 | 11/1948 | McDonald ............................. 43/17.2 |
| 3,246,415 | 4/1966 | Forbes ................................... 43/17.2 |
| 3,754,345 | 8/1973 | Whitehead ............................ 43/17.2 |
| 3,769,928 | 11/1973 | Kahl ................................. 43/17.2 X |
| 3,772,815 | 11/1973 | Burgess ................................. 43/17.2 |
| 3,987,573 | 10/1976 | Clayton ................................. 43/17.2 |

Primary Examiner—Edward M. Coven
Attorney, Agent, or Firm—Karl W. Flocks

[57] ABSTRACT

A fishing lure retriever has a triangular shaped body with a locking member allowing a separation in the body through which the fishing line is passed and having a hooked portion attached to the triangular shaped body. The locking member has a nut-shaped shell spring-mounted on a shell guide member so as to cause a washer to move a pin into a notch on the hook end of a portion of the triangular shaped body.

7 Claims, 7 Drawing Figures

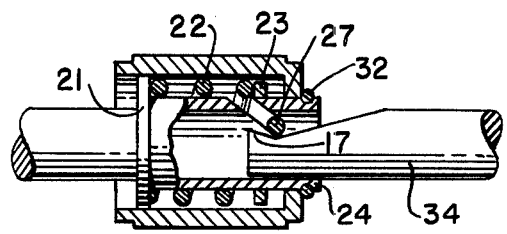
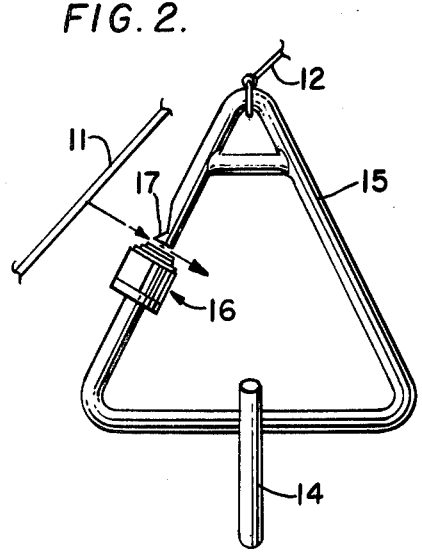
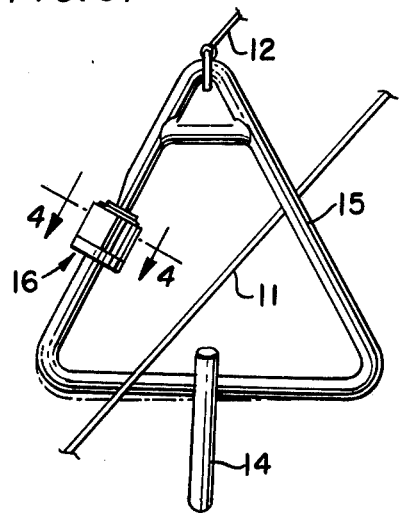
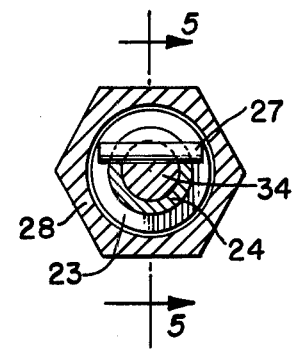
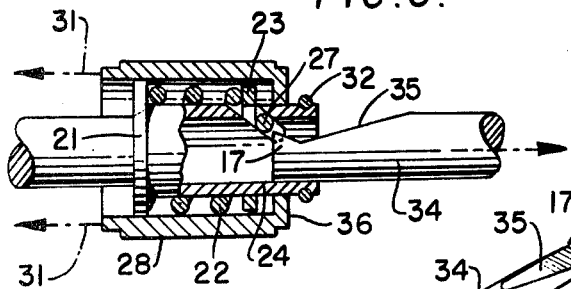
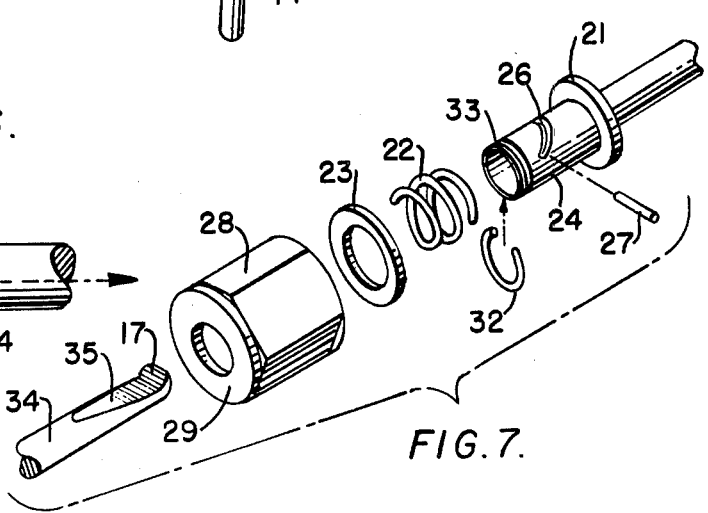

FISHING LURE RETRIEVER

BACKGROUND OF THE INVENTION

The present invention relates to fishing equipment and more particularly to a fishing lure retriever which may be slid down a fishing line to its end so as to dislodge a snagged fishing lure.

During fishing the lure with the hook attached thereto very often becomes snagged on submerged branches, rocks, weeds or debris found in the water and if unable to be retrieved is lost when the line is broken or cut.

SUMMARY OF THE INVENTION

The object of the present invention is to utilize a retriever which may be slid down the fishing line until it reaches the vicinity of the fishing lure and which can then engage the object snagging the lure and possibly release the lure through movement of that object.

It is also an object of the present invention to have a retriever which can easily and through one hand operation have an opening made in the body through which the fishing line can be passed so that retriever then encircles the fishing line and can be slid down that fishing line toward the lure.

With the present invention, the fishing line retriever can be easiy slipped around the line without breaking the line and at any point on the line, can then be closed around the line so that it will not separate from the fishing line, can then slide down the line and engage an object which may be snagging the fishing lure and the hook attached to it.

Basically, the present invention consists of a triangular body with a locking member along one of the sides of the triangle allowing separation of the body portion at the locking member, a corner to which a nylon cord can be attached, and a hooked portion to aid in dislodging the fishing lure.

The locking member on the retriever of the present invention uses a pin in a sloping slot moved down the slot by means of a spring mounted washer so as to maintain a force on the pin opposing movement of the pin upward in the slot, and a hooked member fitting beneath the pin and held in the locking member.

BRIEF DESCRIPTION OF THE DRAWINGS

The above and other objects and advantages of the invention will become apparent upon full consideration of the following detailed description and accompanying drawings in which:

FIG. 2 is a perspective view of the fishing lure retriever in an open position to receive a fishing line;

FIG. 3 is a perspective view of the fishing lure retriever of FIG. 2 after the fishing line has been inserted and the body has been closed to encircle the fishing line;

FIG. 4 is a section view along line 4—4 of FIG. 3;

FIG. 5 is a partially sectioned view along line 5—5 of FIG. 4;

FIG. 6 is a view similar to FIG. 5 except it is used to show the movement of parts to open the body for insertion of the fishing line therethrough; and FIG. 7 is an exploded view of the locking portion of the fishing lure retriever of the present invention.

DESCRIPTION OF THE PREFERRED EMBODIMENT

Figure 1:
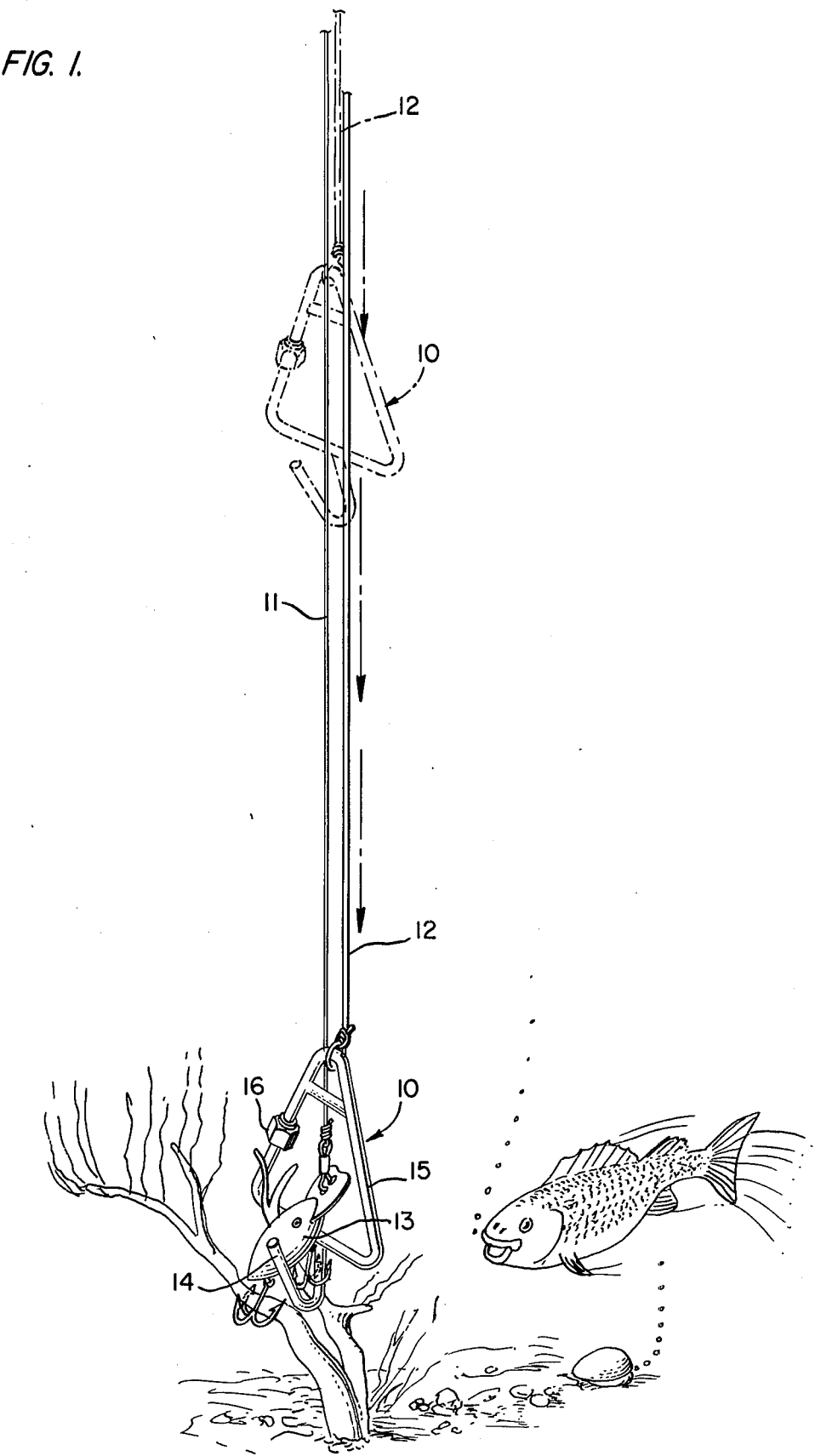
FIG. 1 is an overall perspective of the fishing lure retriever of the present invention in a manner in which it will be used.

In FIG. 1, a fishing lure retriever 10 is first shown in dashed outline as being slid down a fishing line 11, with line 11 preferably extended in a substantially vertical direction for best results, and having a nylon cord 12 attached to a corner thereof. In full lines in the same figure, the fishing lure retriever 10 is shown as having reached the end of fishing line 11 to which a fishing lure 13 is attached to line 11 and also is snagged on an object in the water. By means of pull on line 12 and through use of a hook 14 attached on triangular shaped body 15 of fishing lure retriever 10, the fishing lure 13 may eventually be dislodged from its snagged position.

In order to operate the fishing lure retriever 10 in the manner shown in FIG. 1, it is necessary to move the locking member 16 in a manner to release the hooked end 17 to provide space for fishing line 11 to be passed into the encirclement of triangular shaped body 15 as shown in FIG. 2. Hooked end 17 is then inserted into locking member 16 so as to close the triangular shaped body around fishing line 11 as shown in FIG. 3 which discloses the closed position.

FIGS. 4, 5, 6 and 7 disclose the parts and operation of locking member 16 and its operating relation to hooked end 17.

The locking member is attached by soldering or welding means to a part of triangular shaped body 15 along one of the sides of the triangle as shown in the figures. Attached by soldering or welding means directly to the end of triangular shaped body 15 at the opening thereof in the side is a shoulder 21. Acting against shoulder 21 is a compression spring 22 having at its end a washer 23 which may move in an axial direction on a shell guide member 24. A slot 26 slopes into shell guide member 24 at an angle and in a direction away from spring 22. A pin 27 is positioned in slot 26 and extends outside of the slot with ends beyond shell guide 24 so that these ends encounter washer 23 which is moved by the action of spring 22 so as to push pin 27 downward in slot 26 and attempt to keep it in a position at the bottom of slot 26.

Shell guide member 24 which is attached to shoulder 21 by soldering or welding has a nut shaped shell 28 which covers washer 23, spring 22 and shoulder 21 and which can be moved as shown by arrows 31 in FIG. 6, but which is restricted in its movement in the opposite direction by lock ring 32 which is put into groove 33 on shell guide member 24 during assembly of locking member 16. Shoulder 29 on shell 28 extends radially so as to encounter lock ring 32 at one end of its movement and to press and move washer 23 against the action of spring 22 when moved in the direction of arrows 31.

When hooked end 17 which is formed on a body end 34 by notched portion 35 is inserted through the opening formed in shell 28 by shoulder 29, the hooked end pushes pin 27 upward in slot 26 thereby allowing hooked end 17 to pass beneath the pin, which pin 27 is then moved back downward along slot 26 by the action of washer 23 which in turn has been moved by spring 22, so as to rest in notched portion 35 as shown in FIG. 5. As shown in that figure, shoulder 29 rests against lock ring 32.

When it is desired to release hooked end 17 so as to insert the fishing line 11 through triangular shaped body 15 the shell 28 is moved in the direction of arrows 31 whereby shoulder 29 of shell 28 encounters the extended ends of pin 27 and moves the pin upward in the slot against the action of spring 22 thereby removing pressure against hooked end 17 and allowing hooked end 17 to be withdrawn from the locking member 16. Upon releasing the force in the direction of arrows 31 against shell 28, the spring 22 presses against washer 23 which immediately returns pin 27 down slot 26 to the bottom of the slot. When it is desired to close the triangular shaped body 15 as shown in FIG. 3, the hooked end is merely moved into shell 28 and presses against pin 27 sufficiently to counteract the force of spring 22 and washer 23 and push its way past pin 27 by forcing it at least partially up slot 26. With this form of locking member, a one-handed operation may be employed to insert fishing line 11 within triangular shaped body 15.

Hooked portion 14 whose use has been described above is attached by soldering or welding preferably to one of the sides of triangular shaped body 15 at a center portion thereof so as to project out of the plane of the triangle. In this manner, it is most effective as shown in FIG. 1.

It will be obvious to those skilled in the art that various changes may be made without departing from the scope of the invention. The invention is not to be considered limited to what is shown in the drawings and described in the specification.

What is claimed is:

1. A fishing lure retriever to retrieve a trapped lure attached to a fishing line comprising
   a body shaped to enclose a fishing line and having an open portion of said body,
   said body also having a portion for attaching a cord thereto,
   spring-biased locking means to close said open portion of said body mounted at said open portion of said enclosing body,
   said locking means including
      a shell attached to said body at said open portion and extendable across said open portion,
      a spring means enclosed in said shell,
      a guide member extending into said shell,
      a hook shaped end of said open portion of said body adapted to extend into said shell,
      and a pin means guided by said guide member into contact with said hook shaped end for engagement therewith to hold said hook shaped end in a position extending into said shell to hold said shell across said open portion.

2. The fishing lure retriever of claim 1, further characterized by
   said body being triangular shaped.

3. The fishing lure retriever of claim 2, further characterized by
   a hooking means attached to said body on one of the sides of said triangular shaped body.

4. The fishing lure retriever of claim 3, further characterized by
   said portion for attaching a cord located at a corner of said triangular shaped body opposite said side with said hooking meas.

5. The fishing lure retriever of claim 1, further characterized by
   restraining means to contain said spring means, on one end of said spring means,
   and washer means on the opposite end of said spring means between said spring means and said pin means to retain the position of said pin means by force of said spring means.

6. The fishing lure retriever of claim 5, further characterized by
   said guide member having a slot therein sloping inward of said guide member in a direction away from said spring means.

7. The fishing lure retriever of claim 6, further characterized by
   said guide member being hollow and adapted to receive said hook shaped end past said pin means.

* * * * *